United States Patent
Steele

[15] 3,659,893
[45] May 2, 1972

[54] CAMPER VEHICLE

[72] Inventor: Byron D. Steele, 1119 Tiffany Rd., Silver Spring, Md. 20904

[22] Filed: June 22, 1970

[21] Appl. No.: 48,207

[52] U.S. Cl. ............................................. 296/23 R, 135/1
[51] Int. Cl. .......................................................... B60p 3/34
[58] Field of Search ............... 296/23, 23 C, 23 MC, 27, 23.2; 135/1 A, 3 A, 4 A, 5 A

[56] References Cited

UNITED STATES PATENTS

| | | | |
|---|---|---|---|
| 3,456,978 | 7/1969 | Daniels | 296/23 |
| 3,454,020 | 7/1969 | Grossman | 296/23 |
| 2,879,103 | 3/1959 | Hall | 296/23.3 |

*Primary Examiner*—Philip Goodman
*Attorney*—John S. Lacey

[57] ABSTRACT

A vehicle of the camper type having a vertically extendible top and a sleeping compartment with extensions to receive beds when the top is raised, thus providing standing room within the vehicle. Pneumatic jacks, supplied from an on-board air storage tank, are used for raising the top, and simple latches retain it in elevated position when the sleeping compartment is in use.

5 Claims, 7 Drawing Figures

Patented May 2, 1972

INVENTOR
BYRON D. STEELE

BY John S. Lacey
ATTORNEY

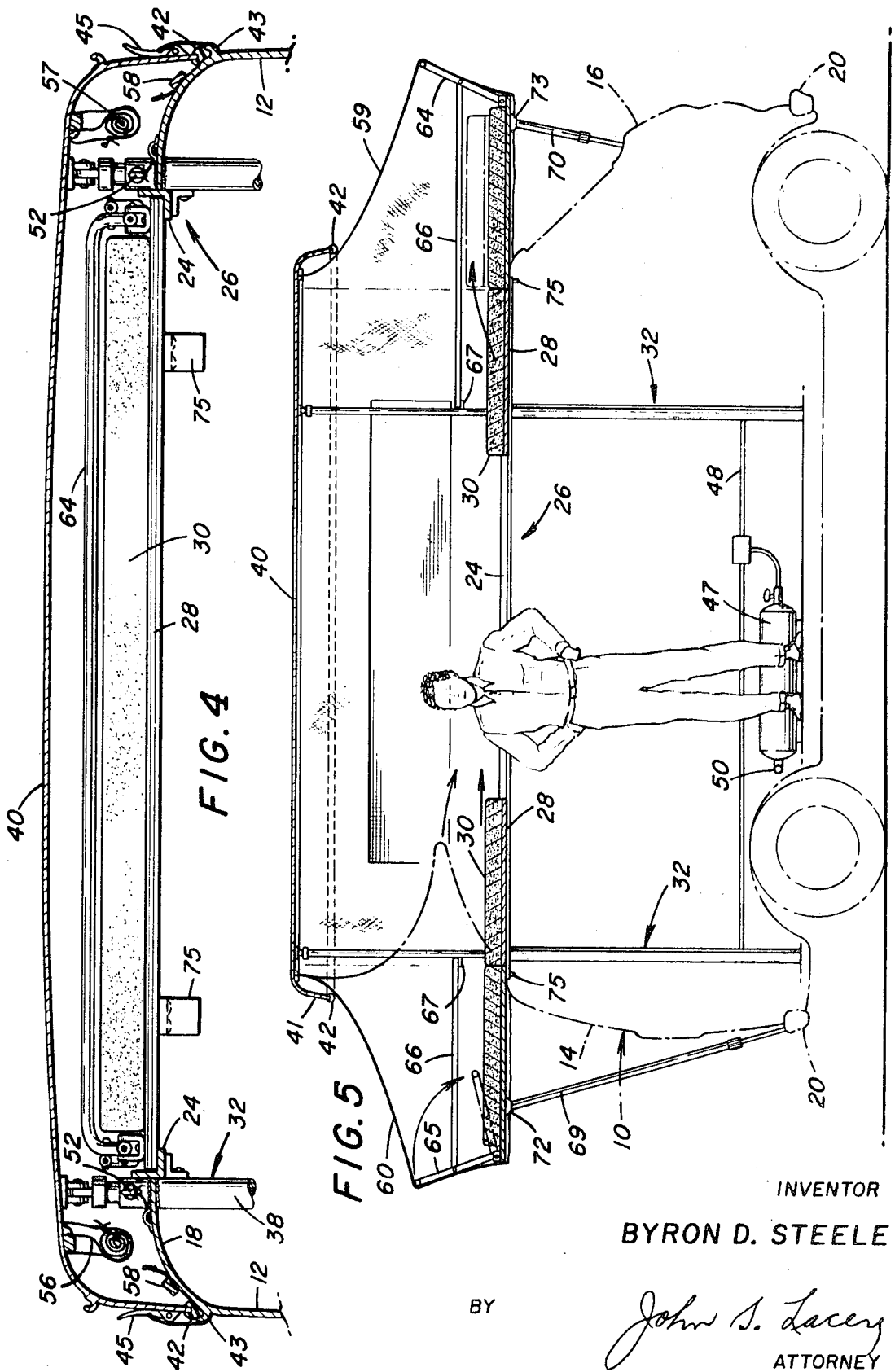

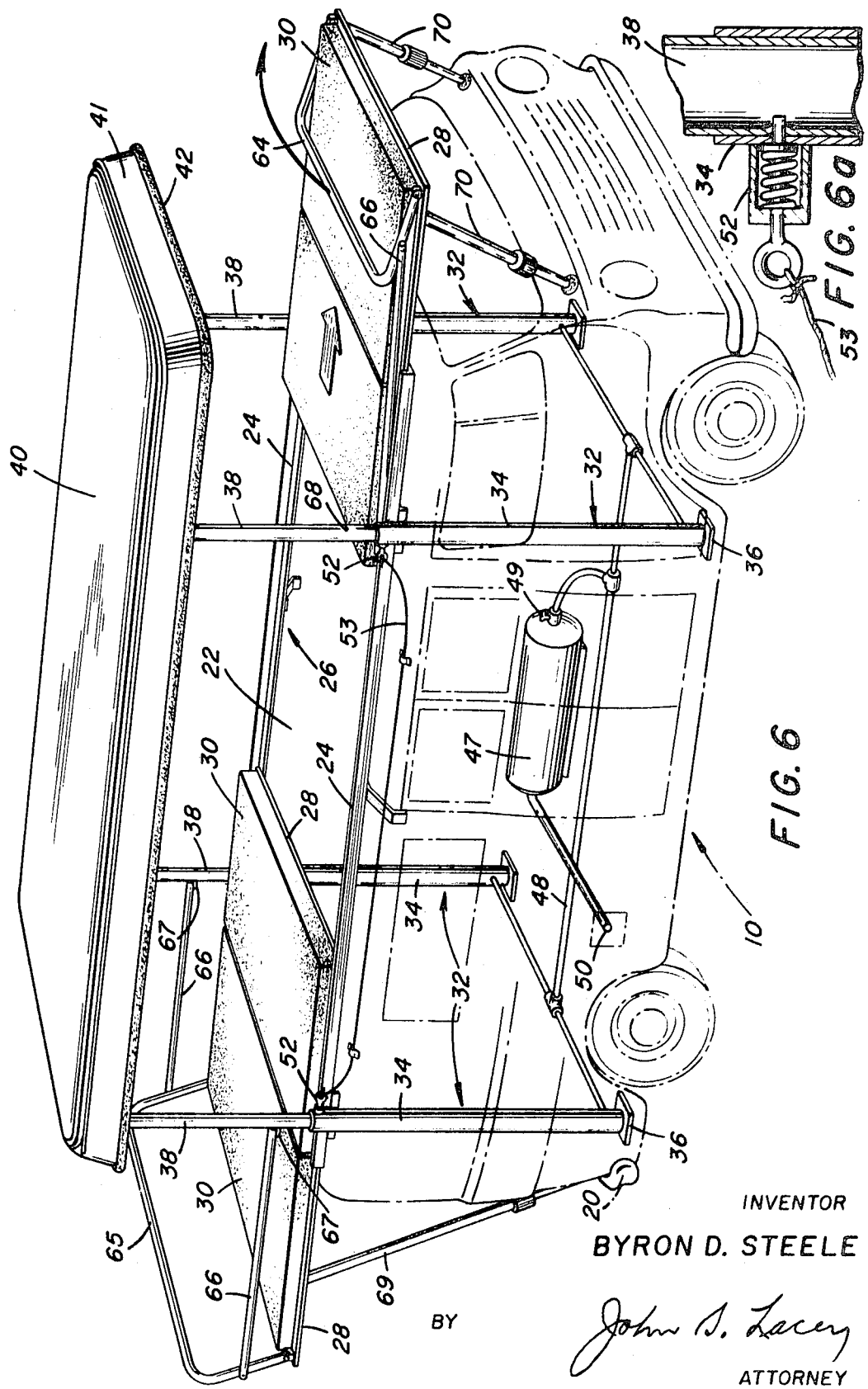
INVENTOR
BYRON D. STEELE
*John S. Lacey*
ATTORNEY

CAMPER VEHICLE

BACKGROUND AND OBJECTS

The present invention relates generally to automotive vehicles and more particularly to a vehicle of the camper type.

In recent years vehicles known as campers or sport vans have enjoyed constantly increasing popularity because of their ease of handling, flexibility and convenience. Campers are generally much smaller than house trailers, however, with the result that maximum use must be made of all available space therein. In addition, because of their smaller size and particular design, campers suffer from lack of head room, so much so that it is usually not possible for an adult to stand fully erect in one of them.

The principal object of the invention, therefore, is to provide a camper vehicle which has an extendible top and a sleeping compartment with extensions to receive beds when the top is raised, thus providing an unobstructed walk space which will accommodate one or more adults standing erect.

Another object of the invention resides in the provision of a camper vehicle employing pneumatic jacks for raising the top to its elevated position and for cushioning the descent of said top when it is being lowered, the jacks being supplied from an air source that can be replenished, as needed, at any automotive vehicle service station.

As a further object of the invention provides simple means for effectively holding the top in either elevated or lowered position.

And still another object is to provide a camper vehicle which will accommodate a relatively large number of persons in a relatively small space.

A further object is to provide a camper vehicle that will be easy to operate and maintain, and will be rugged and durable in use.

Other objects of the invention not specifically mentioned hereinabove will become evident from a reading of the following description.

BRIEF DESCRIPTION OF THE DRAWINGS

FIG. 4 is an enlarged transverse section showing the upper end portion of the vehicle with the top lowered;

FIG. 5 is a side elevation, partly in section and with portions of the vehicle itself in phantom, showing the camper vehicle with the top elevated, the sleeping compartment with its end extensions ready for use with double beds in place, and with supports for the end extensions;

FIG. 6 is a perspective view particularly showing the top elevating mechanism and how the beds are mounted for sliding movement to provide additional head room when the top is elevated;

and FIG. 6a is a detail section showing one of the latches used for securing the top in raised or lowered position.

BRIEF SUMMARY

Figure 1:
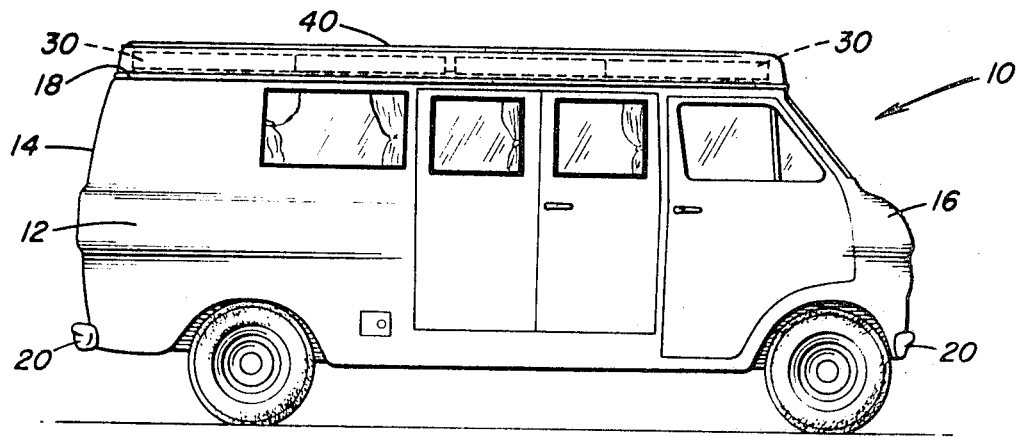
FIG. 1 is a side elevation of the camper vehicle of the present invention as it would appear ready for highway travel.

The camper vehicle constituting the present invention comprises a van-like body having a roof which is formed with an opening that extends substantially its entire length. Mounted on the roof adjacent the opening are rails which define a track. A vertically extendible top is mounted on pneumatic jacks located at each corner of the body, the top when in lowered position extending above the roof in engagement therewith. An air storage tank is carried in the vehicle, at a convenient spot, and supplies air under pressure for raising the top to its operative position. Residual air in the jacks and in the lines from the tank to said jacks will cushion the descent of the top when it is desired to lower the same.

Mounted on the roof about the opening is a collapsible sleeping compartment which, when expanded to operative position, has forward and rear extensions. Base boards, which carry beds, are slidable on the track from positions closing the opening in the roof, when the sleeping compartment is collapsed and the top is lowered, to positions partially within the extensions, when the top is raised and the sleeping compartment is expanded, to provide walking space within the van. Suitable braces are placed between the exterior corners of the extensions and the vehicle's bumpers to provide firm support for the extensions and the beds therein.

Suitable latches are employed for securing the top in elevated position and for anchoring it to the roof in lowered position.

DETAILED DESCRIPTION OF THE INVENTION

Referring now more particularly to the drawings, the numeral 10 indicates generally the body of the improved camper vehicle constituting the present invention. The body 10 includes side walls 12, a rear end wall 14, a motor compartment 16 and a roof 18. The usual bumpers 20 are mounted on the front and rear of the vehicle. As best seen in FIG. 6, the roof 18 has an opening 22 which extends throughout the major portion of its length and breadth. Mounted on the side margins of the opening are angle bars 24 which define a track 26, the track extending throughout the length of said opening. Slidable on the track are base boards 28, of plywood or other suitable lightweight material, each of the base boards having a bed 30 thereon, the beds conveniently comprising pads of foam rubber or the like. The base boards 28 and beds 30 thereon are movable along the track 26 from the positions shown in broken lines in FIG. 1, wherein they close the opening 22 in the roof, to positions extending toward and beyond the forward and rear ends of the roof, as shown in broken lines in FIG. 2, in which positions the roof will be largely open, to permit one or more adults to stand erect in the vehicle.

As best seen in FIGS. 4, 5 and 6, the body 10 is provided with preferably four pneumatic jacks 32, the jacks being mounted within said body near the corners thereof. Each of the jacks comprises a cylinder 34 which has its lower end secured to the body by a foot plate 36 and its upper end secured to the roof 18 near a corner of the opening 22, and a piston 38 that fits snugly but slidably in the cylinder 34 and which has its upper end secured to the under side of a substantially flat top 40 near one corner thereof. The top 40 has a slightly flared skirt 41 which extends about its perimeter and has a bead 42, preferably of rubber, secured to its lower edge, the bead being engageable with a rim 43, when the top is lowered, to provide a tight seal between said top and the roof 18. As will be clear from a scrutiny of FIG. 1, the top, when in lowermost position, entirely covers the roof 18. Removable clamps 45, shown in FIG. 4, tightly secure the top in lowered position when the vehicle is being used for normal highway travel.

Referring particularly to FIG. 6, a supply tank is shown at 47 within the vehicle, the tank being connected to the lower end of each of the cylinders 34 by lines 48. A valve 49 controls fluid flow from the tank into the lines. The fluid most conveniently carried in the tank 47 would be air, which could be obtained from any gasoline filling station, but it should be understood that other gases could be used if desired. It should also be understood that the showing of the tank 47, lines 48 and valve 49 in FIG. 6 are purely diagrammatic. For example, in actual practice the tank would be placed out of sight, such as under a seat or in the motor compartment 16. The fluid, which is admitted to the tank through an inlet pipe 50, would be under sufficient pressure to raise the pistons 38 in the cylinders 34, when the valve 49 is opened, and thus elevate the top 40 above the roof 18. To secure the top in either elevated or lowered position, spring-pressed latches 52, shown in FIG. 6a, are employed, companion pairs of said latches at each side of the vehicle being connected for simultaneous operation by lanyards, one of which is shown at 53.

When it is desired to lower the top 40, the lanyards 53 are manually engaged and pulled downwardly for releasing the latches 52. When the latches are released, the top will descend by the force of gravity. Its descent, however, will be cushioned by residual air in the cylinders. It should be understood that the pistons 38 fit snugly enough to be acted upon by the high pressure air admitted to the cylinders but not so tightly that air cannot escape once the top is raised and the valve 49 closed.

Positioned between the roof 18 and the top 40 and surrounding the opening 22 exteriorly of the jacks 32 is a collapsible compartment 55. The compartment is made of pliable yet strong fabric and comprises side panels 56, which may be rolled when stored, as shown in FIG. 4, and which have lower end edges 57 which are secured to the roof 18, when the compartment is expanded, by fasteners 58 of the slide type. The compartment 55 further comprises forward and rear extensions 59 and 60. The side panels 56 are provided with windows 61 having screens that may be closed by flaps 62, secured in place by zipper-type fasteners.

Figure 2:
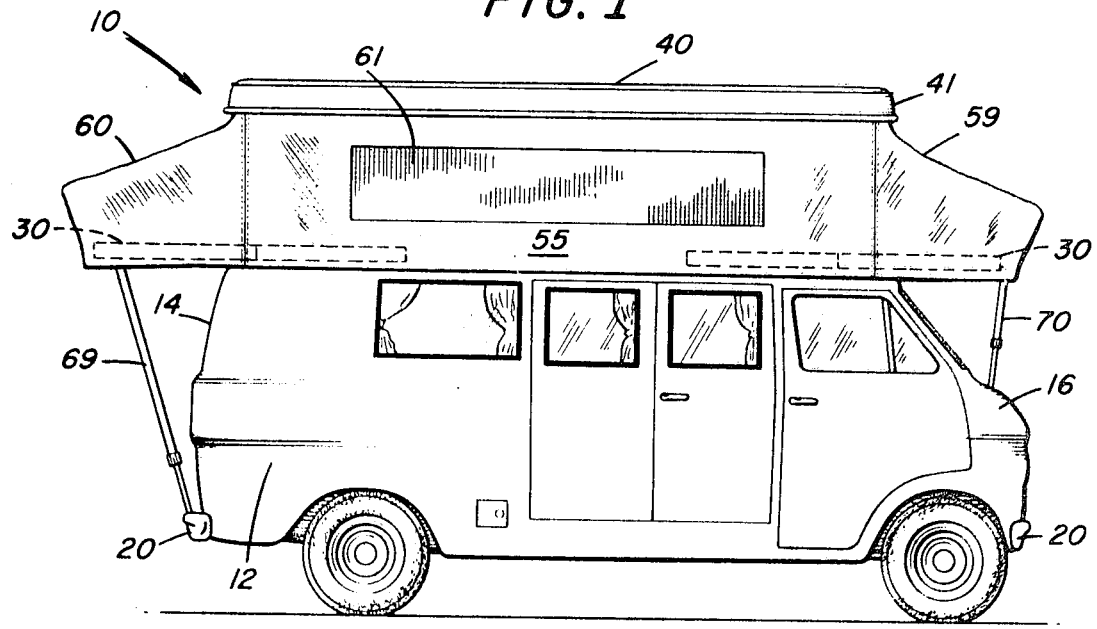
FIG. 2 is a view similar to FIG. 1 but showing the top elevated and the sleeping compartment with its end extensions in place, the beds employed being shown in broken lines.
Figure 3:
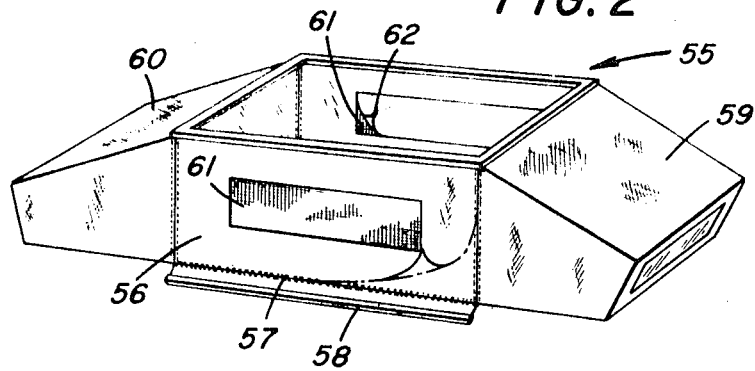
FIG. 3 is a detail perspective view of the sleeping compartment per se, on a smaller scale than in FIG. 2.

When the camper vehicle is made ready for highway use, the compartment 55 is collapsed and stored beneath the lowered top 40 and the base boards 28 and 30 are moved inwardly on the track 24 to close the opening 22, as shown in broken lines in FIG. 1. As best seen in FIG. 5, the extensions 59 and 60 are pushed inwardly to overlie the beds 30. The side panels are rolled upwardly and secured to the underside of the top 40, and the latches 52 are engaged with the pistons 38 near their upper ends.

To make the camper vehicle ready for camping, the top 40 is elevated by the pneumatic jacks 32 to the position best shown in FIG. 5, and the extensions 59 and 60 are moved into place, the extension 59 extending beyond the rear of the vehicle and the extension 60 overhanging the motor compartment 16. The side panels 56 are lowered into place and the base boards 28, with beds 30 thereon, are moved along the track 24 into the extensions, two of said boards being moved into the forward extensions 59 and two into the rear extension 60. As best seen in FIGS. 4 and 6, the foremost and rearmost of the base boards 28 are provided with braces 64 and 65, respectively, which prevent collapse of the extensions when the compartment is in use. The braces 64 and 65 are held in operative positions by side rods 66 which are detachably connected to the pistons 38 of the jacks 32 by pins 67 that engage in holes 68 (FIG. 6) in said pistons.

In FIG. 6 the foremost brace 64 is shown folded and the rearmost brace 65 is shown extended.

Movement of the base boards 28 toward the opposite ends of the vehicle will, as best shown in FIG. 5, provide head room within the vehicle without sacrificing space needed for sleeping accommodations. Thus, the need for a hammock within the vehicle is eliminated, and a full-grown adult may stand and move around within the vehicle in comfort. Additional walk space may be provided by stacking the two beds, at each end of the vehicle, one on top of the other, as indicated by the arrows in FIGS. 5 and 6.

To assure proper support for the foremost and rearmost of the base boards 28 when in use, supports 69 and 70 are employed. The supports 69 are placed between the rear bumper 20 and receptacles 72 on the rearmost base board 28, and the supports 70 are mounted between receptacles 73 on the foremost base board and the hood of the engine compartment 16. Stops 75, shown in FIGS. 4 and 5, limit movement of the foremost and rearmost base boards 28 so that they will be prevented from moving beyond the track 26.

It is believed that the construction and operation of my improved camper vehicle will be fully understood from the foregoing description.

I claim:

1. A camper vehicle comprising, in combination, a van-type body having a motor compartment at one end and a roof formed with an opening,
   a track mounted in the roof adjacent the opening,
   a top,
   means for elevating the top to extend above the roof,
   a compartment extending between the top and the roof when the top is elevated and having extensions, one of said extensions projecting above the motor compartment and the other extending beyond the opposite end of the body,
   base boards mounted to move on the track from positions within the opening to positions within the extensions and clearing the opening to provide standing room within the vehicle,
   and a bed on each of the base boards.

2. The camper vehicle as recited in claim 1,
   wherein the compartment includes side panels which are movable from rolled positions adjacent the top, when stored, to positions with their lower end edges secured to the roof when the top is elevated.

3. The camper vehicle as recited in claim 1,
   wherein the base boards and beds of each pair of base boards and beds may be stacked in each extension of the compartment to provide additional headroom in the body,
   and including supports mounted between the body at the front and rear thereof and the lowermost base board in each said extension.

4. The camper vehicle as recited in claim 3,
   including additionally foldable braces in each of the compartment extensions.

5. The camper vehicle as recited in claim 1,
   including releasable means for latching the top in elevated position,
   said releasable latching means comprising spring-pressed pins mounted on the jacks, and a lanyard connecting a pair of said pins.

* * * * *